United States Patent
Poster et al.

(10) Patent No.: US 9,309,917 B2
(45) Date of Patent: *Apr. 12, 2016

(54) BIMETALLIC SHAFT FOR GEARBOX SYSTEMS TO LIMIT WEAR AND CORROSION

(71) Applicant: Bell Helicopter Textron Inc., Fort Worth, TX (US)

(72) Inventors: Scott Poster, Arlington, TX (US); David Bockmiller, Keller, TX (US); Mark Przybyla, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/225,054

(22) Filed: Mar. 25, 2014

(65) Prior Publication Data

US 2014/0256458 A1 Sep. 11, 2014

Related U.S. Application Data

(63) Continuation of application No. 13/793,080, filed on Mar. 11, 2013, now Pat. No. 8,721,462.

(51) Int. Cl.
*F16C 3/02* (2006.01)

(52) U.S. Cl.
CPC ............ *F16C 3/023* (2013.01); *Y10T 403/478* (2015.01); *Y10T 403/74* (2015.01)

(58) Field of Classification Search
CPC .... F16C 3/023; Y10T 403/74; Y10T 403/478

USPC .......... 464/175, 181, 182, 902–906; 228/903; 285/329; 403/271, 404; 244/60

See application file for complete search history.

(56) References Cited

U.S. PATENT DOCUMENTS

| | | | |
|---|---|---|---|
| 2,135,699 | A | 11/1938 | Campbell |
| 2,780,080 | A | 2/1957 | Cork |

(Continued)

FOREIGN PATENT DOCUMENTS

| | | |
|---|---|---|
| DE | 10144979 | 4/2003 |
| DE | 10356231 | 6/2005 |

OTHER PUBLICATIONS

Communication Pursuant to Article 94(3) EPC issued in European Application No. 13167389.9 on Apr. 16, 2014; 6 pages.

(Continued)

*Primary Examiner* — Gregory Binda
(74) *Attorney, Agent, or Firm* — Fish & Richardson P.C.

(57) ABSTRACT

An apparatus includes a first shaft member including a first material and having a first shaft axis, a first distal end having a first diameter, and a first proximate end, and a second shaft member including a second material different from the first material, and having a second shaft axis, a second proximate end having a second diameter, and a second distal end. A joint permanently affixes the first distal end of the first shaft member to the second proximate end of the second shaft member such that the first shaft axis is aligned with the second shaft axis, where the first distal end substantially abuts the second proximate end, and wherein the first diameter is substantially identical to the second diameter. The second shaft member protrudes through a housing, the housing including a seal sealing against an outer diameter of the second shaft member.

11 Claims, 5 Drawing Sheets

(56) References Cited

U.S. PATENT DOCUMENTS

| | | | |
|---|---|---|---|
| 3,016,721 | A | 1/1962 | Davis |
| 4,496,096 | A * | 1/1985 | Persson |
| 4,722,630 | A * | 2/1988 | Fang ........................ F01D 5/025 403/404 X |
| 4,942,999 | A | 7/1990 | Oda et al. |
| 5,066,547 | A * | 11/1991 | Ishida et al. ................... 228/903 |
| 5,112,259 | A | 5/1992 | McElroy, Jr. et al. |
| 5,601,493 | A | 2/1997 | Nakazono et al. |
| 5,906,400 | A * | 5/1999 | Gandy ........................ 285/329 X |
| 6,332,844 | B1 | 12/2001 | Hayama et al. |
| 6,843,509 | B2 * | 1/2005 | Nelson ...................... 285/329 X |
| 2006/0157007 | A1 | 7/2006 | Horton |

OTHER PUBLICATIONS

Communication Pursuant to Article 94(3) EPC issued in European Application No. 13167389.9 on Sep. 30, 2014, 3 pages.

Mancuso, John; "Couplings and Joints"; 2nd edition; Marcel Dekker, Inc.; Baltimore; pp. 247-260; TJ183.M36; 1999.

Search Report issued in European Application No. 13167389.9 on Dec. 2, 2013; 3 pages.

Communication Pursuant to Article 94(3) EPC issued in European Application No. 13167389.9 on Jan. 10, 2014; 6 pages.

Office Action issued in U.S. Appl. No. 13/793,080 on Dec. 2, 2013; 11 pages.

Notice of Allowance issued in U.S. Appl. No. 13/793,080 on Feb. 27, 2014, 5 pages.

* cited by examiner

BIMETALLIC SHAFT FOR GEARBOX SYSTEMS TO LIMIT WEAR AND CORROSION

CROSS-REFERENCE TO RELATED APPLICATIONS

This application is a continuation of U.S. patent application Ser. No. 13/793,080 entitled "Bimetallic Shaft for Gearbox Systems to Limit Wear and Corrosion" filed on Mar. 11, 2013, now U.S. Pat. No. 8,721,462, the entire contents of which is hereby incorporated by reference for all purposes.

BACKGROUND

Shafts in rotary gearbox applications, including, but not limited to, helicopter gearbox applications, are often exposed to damage, wear, and corrosion when a shaft must interface with components external to the gearbox. The present solution for such applications is to utilize a protective coating or galvanic plating to protect the shaft. This coating or plating is susceptible to damage, wear, and corrosion itself, which also must be repaired. Repair of this coating is difficult, costly, and often requires the removal and overhaul of the gearbox. Accordingly, there is a need for a gearbox shaft design that substantially reduces or eliminates corrosion and wear.

SUMMARY

In some embodiments of the disclosure, an apparatus is disclosed as comprising a first shaft member comprising a non-corrosion-resistant material and having a first shaft axis, a second shaft member comprising a corrosion-resistant material and having a second shaft axis, and a joint, that permanently affixes the first shaft member to the second shaft member such that the first shaft axis is aligned with the second shaft axis.

In other embodiments of the disclosure, a gearbox is disclosed as comprising a gearbox housing, a gearbox shaft having a first shaft member axially aligned with a second shaft member, wherein the first shaft member comprises a non-corrosion-resistant material, wherein the second shaft member comprises a corrosion-resistant material, and wherein a joint permanently affixes the first shaft member to the second shaft member, and a gearbox shaft seal, wherein the gearbox shaft seal surrounds the gearbox shaft radially and provides a barrier between a first environment inside the gearbox housing and a second environment outside the gearbox housing, wherein the first shaft member is not in contact with the second environment.

In yet other embodiments of the disclosure, a method is disclosed as providing a bimetallic gearbox shaft comprising a first shaft member comprising a non-corrosion-resistant material and having a first shaft axis, a second shaft member comprising a corrosion-resistant material and having a second shaft axis, and a joint that permanently affixes the first shaft member to the second shaft member such that the first shaft axis is aligned with the second shaft axis.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide a bimetallic gearbox shaft in a gearbox system, such as, but not limited to, a helicopter gearbox system. For example, in cases where a gearbox shaft must interact with components external to the gearbox housing, thereby rendering the gearbox shaft prone to damage, wear, and/or corrosion, it may be desirable to utilize a corrosion-resistant material for the construction of the exposed portion of the gearbox shaft. In some embodiments of the disclosure, systems and methods are disclosed that comprise providing a bimetallic gearbox shaft, wherein a first shaft member comprising a non-corrosion-resistant material is axially aligned with a second shaft member comprising a corrosion-resistant material, wherein a joint permanently affixes the first shaft member to the second shaft member. In some embodiments, the gearbox shaft may comprise a gearbox, wherein the second shaft member protrudes externally from the gearbox, and wherein the first shaft member does not protrude from the gearbox. In some embodiments, the gearbox shaft may be a part of an aircraft, wherein the second shaft member is mechanically coupled to an engine, and wherein the gearbox is mechanically coupled to a rotor, propeller, or proprotor.

Figure 1:
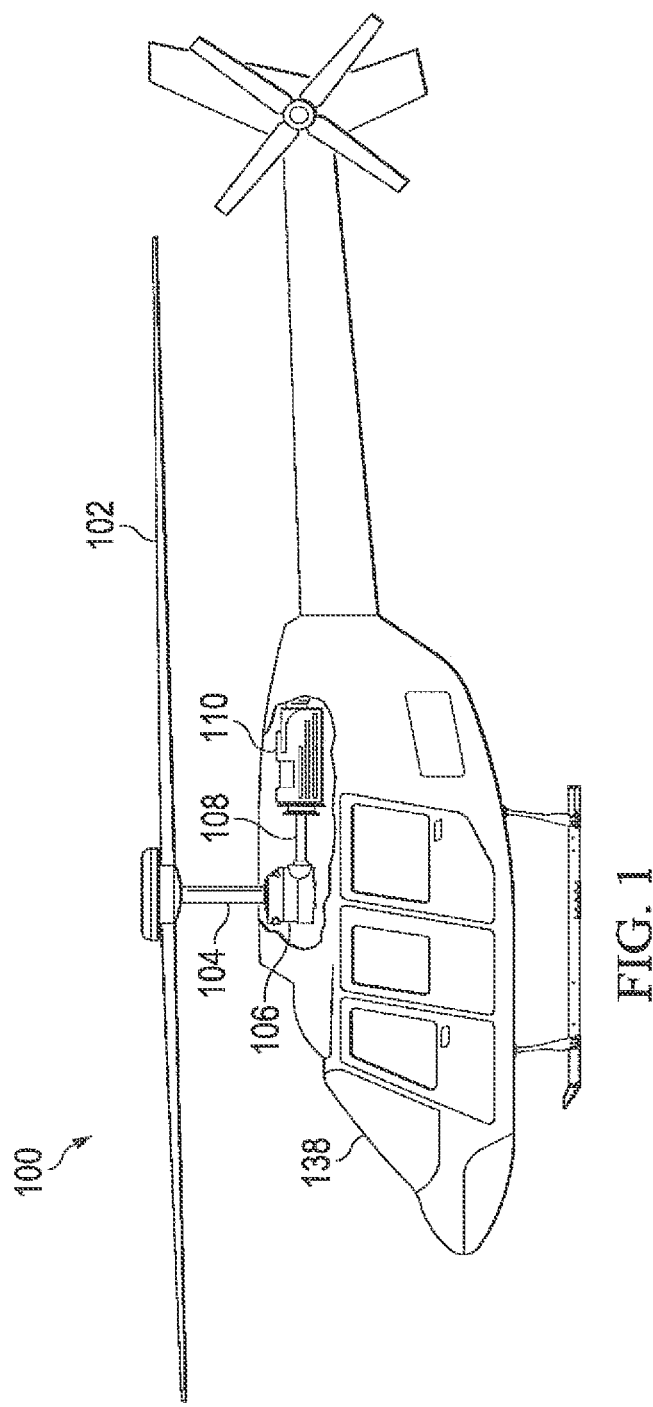
FIG. 1 is a orthogonal side view of an aircraft according to an embodiment of the disclosure.

Referring now to FIG. 1, an orthogonal side view of an aircraft 100 is shown according to an embodiment of the disclosure. It should be understood that while the aircraft 100 example depicted comprises a helicopter, embodiments of the disclosure are not limited to any particular setting or application, and embodiments may be used in any setting or application requiring a mechanical device that transmits torque. An aircraft 100 generally comprises a fuselage 138 and an engine 110. An aircraft 100 may also comprise a gearbox 106 and a gearbox shaft 108. The gearbox shaft 108 generally may be configured to interface with a component external to the gearbox 106. This component generally requires a gearbox shaft 108 that is capable of transmitting torque and rotation. For example, in some embodiments of the disclosure, the gearbox shaft 108 may be configured to mechanically couple to an engine 110 (e.g. a turbine or piston engine). The gearbox 106 may also be coupled to a component to which it transmits torque and rotation. According to some embodiments of the disclosure, the gearbox 106 may mechanically couple to a rotor 102 through a rotor shaft 104. In alternative embodiments of the disclosure, the gearbox 106 may mechanically couple to a propeller (e.g. in an airplane) or proprotor (e.g. in a tiltrotor) through a propeller shaft, drive shaft, or other mechanical component requiring the transmittal torque and rotation.

Figure 2:
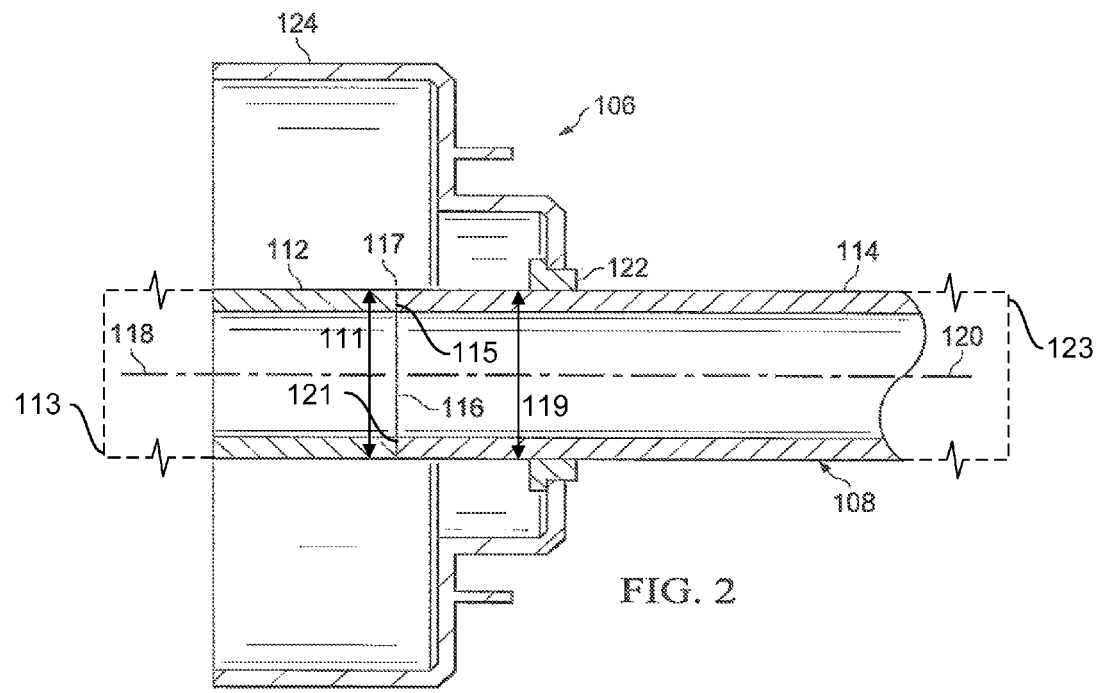
FIG. 2 is an orthogonal cross-section view of a gearbox comprising a gearbox shaft according to an embodiment of the disclosure.

Referring now to FIG. 2, an orthogonal cross-section view of a gearbox 106 is shown according to an embodiment of the disclosure. The gearbox 106 generally comprises a gearbox housing 124 and a gearbox shaft seal 122. The gearbox shaft seal 122 generally forms a seal between the gearbox housing 124 and the gearbox shaft 108. In some embodiments of the disclosure, the gearbox shaft seal 122 surrounds the gearbox shaft 108 radially and provides a barrier between a first environment inside the gearbox housing 124 and a second environment outside the gearbox housing 124. The gearbox shaft seal 122 includes a sealing diameter that is substantially identical to the diameter of the gearbox shaft 108. The gearbox shaft 108 generally comprises a first shaft member 112 having a first shaft axis 118, a first diameter 111, a first proximate end 113, and a first distal end 115, and a second shaft member 114 having a second diameter 119, a second proximate end 121, a second distal end 123, and a second shaft axis 120 that generally coincides with the first shaft axis 118. The first diameter 111 is substantially identical to the second diameter 119. During normal operation, the first shaft member 112 rotates about the first shaft axis 118, and the second shaft member 114 rotates about the second shaft axis 120. A joint 116 permanently affixes the first shaft member 112 to the second shaft member 114 such that the first shaft axis 118 and the second shaft axis 120 are aligned. In some embodiments of the disclosure, the joint 116 is located internally to the gearbox housing 124. In other embodiments of the disclosure, the second shaft member 114 protrudes from the gearbox housing 124 into the environment outside the gearbox housing 124, while the first shaft member 112 does not protrude from the gearbox housing 124.

Figure 3:
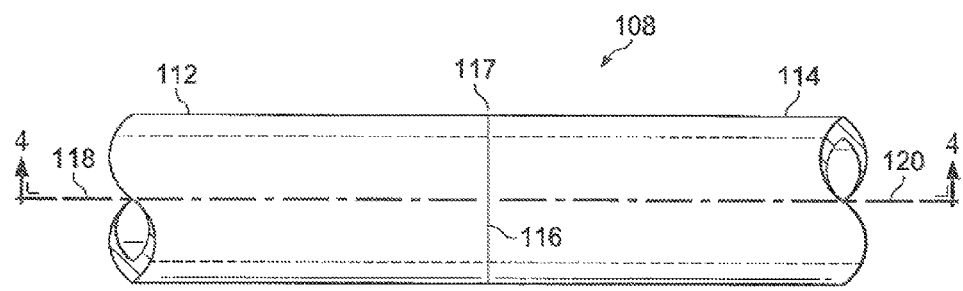
FIG. 3 is an orthogonal side view of a gearbox shaft, showing cut line 4-4 according to an embodiment of the disclosure.
Figure 4:
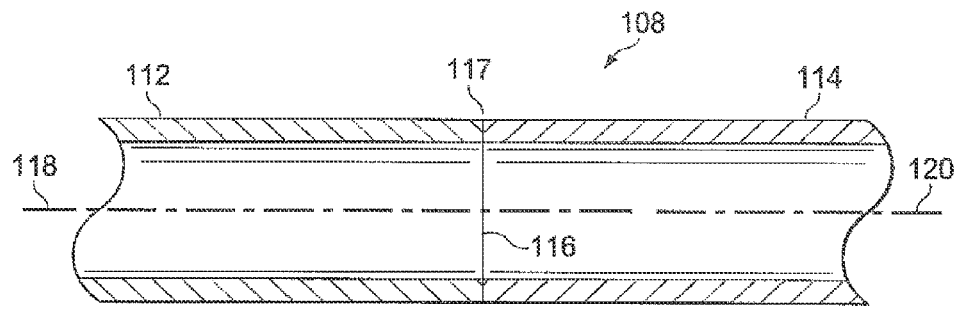
FIG. 4 is an orthogonal cross-section view of a gearbox shaft according to an embodiment of the disclosure, taken along line 4-4 in FIG. 3.

Referring now to FIG. 3 and FIG. 4, an orthogonal side view of a gearbox shaft 108 and an orthogonal cross-section view of a gearbox shaft 108 are shown, respectively, according to an embodiment of the disclosure. The gearbox shaft 108 generally comprises a first shaft member 112 and a second shaft member 114. As with the embodiment in FIG. 2, the first shaft member 112 generally comprises a first shaft axis 118 about which the first shaft member 112 rotates during operation, and the second shaft member 114 generally comprises a second shaft axis 120 about which the second shaft member 114 rotates during operation. The first shaft member 112 is permanently affixed to the second shaft member 114 by a joint 116. The joint 116 is configured such that the first shaft axis 118 may be aligned and coincident with the second shaft axis 120. Generally, the first shaft member 112 and second shaft member 114 comprise different materials. The first shaft member 112 generally comprises a non-corrosion-resistant material. This non-corrosion-resistant material should be conducive to the manufacture of gears. In some embodiments, the non-corrosion-resistant material of the first shaft member 112 may comprise carbon steel. Contrarily, the second shaft member 114 generally comprises a corrosion-resistant material. In some embodiments, the corrosion-resistant material of the second shaft member 114 may comprise stainless steel, nickel, titanium, tantalum, chromium or other material that a person having ordinary skill in the art would appreciate as having corrosion-resistant properties. In other embodiments, the corrosion-resistant material of the second shaft member 114 may comprise a composite material comprising carbon fibers or fiberglass.

Figure 6:
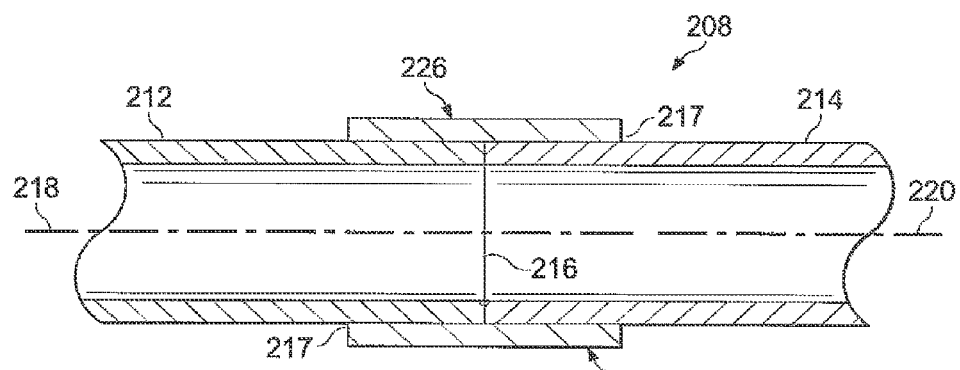
FIG. 6 is an orthogonal cross-section view of a gearbox shaft comprising a collar according to an embodiment of the disclosure, taken along line 6-6 in FIG. 5.
Figure 11:
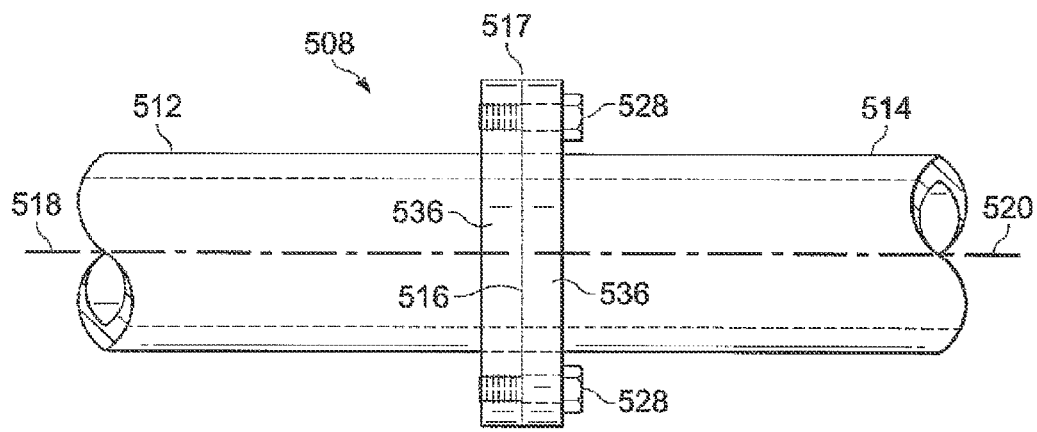
FIG. 11 is an orthogonal side view of a gearbox shaft comprising a bolted flange according to an embodiment of the disclosure.

As previously stated, a joint 116 permanently affixes the first shaft member 112 to the second shaft member 114, wherein the first shaft member 112 and the second shaft member 114 may comprise different materials. Accordingly, the configuration of the joint 116 may depend on the type of non-corrosion-resistant material used for the first shaft member 112 and the corrosion-resistant material used in the second shaft member 114. In some embodiments of the disclosure, the joint 116 may comprise a weld 117 to join the two dissimilar materials, including, but not limited to a friction weld. However, in other embodiments, the joint 116 may comprise the use of one or more fasteners, including, but not limited to bolts, to permanently affix the first shaft member 112 to the second shaft member 114 as shown in FIG. 6 and FIG. 11. In yet other embodiments, the joint 116 may comprise flanged shaft members as shown in FIG. 11. In yet other embodiments, the joint 116 may be a hinged joint, such as a universal joint.

In some instances, the inherent structure of the first shaft member 112 and the second shaft member 114 may vary. In some embodiments of the disclosure, the first shaft member 112 and/or the second shaft member 114 may comprise a hollow, tubular structure. However, in other embodiments of the disclosure, the first shaft member 112 and/or the second shaft member 114 may comprise a solid structure. Furthermore, in some embodiments, the first shaft member 112 and the second shaft member 114 may comprise corresponding diameters and/or dimensions. In other embodiments, however, the first shaft member 112 and the second shaft member 114 may comprise different diameters and/or dimensions. Furthermore, it should be noted that while the first shaft member 112 and the second shaft member 114 comprise a first shaft axis 118 and a second shaft axis 120, respectively, the disclosure does not limit the structure of the first shaft member 112 and the second shaft member 114 to a cylindrical shape. In some embodiments, the first shaft member 112 and the second shaft member 114 may comprise an alternative shape or form that is favorable to rotating shaft applications, such that the first shaft member 112 and the second shaft member 114 may rotate symmetrically about the first shaft axis 118 and the second shaft axis 120, respectively, during normal operation.

Figure 5:
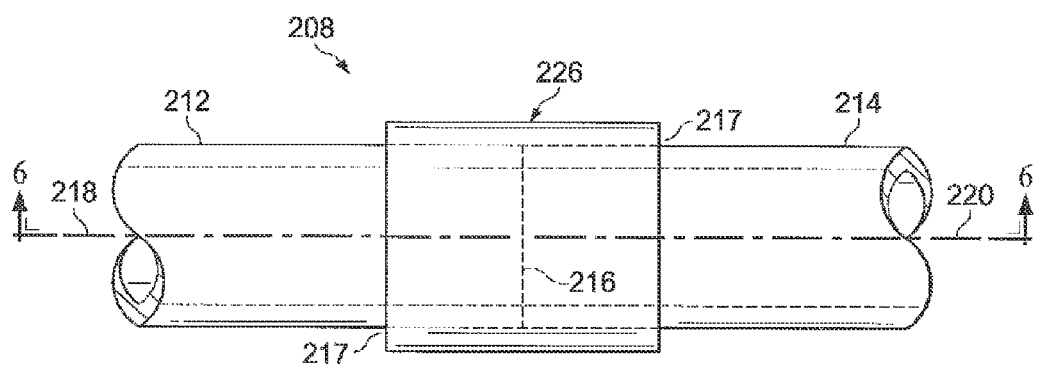
FIG. 5 is an orthogonal side view of a gearbox shaft comprising a collar, showing cut line 6-6 according to an embodiment of the disclosure.
Figure 7:
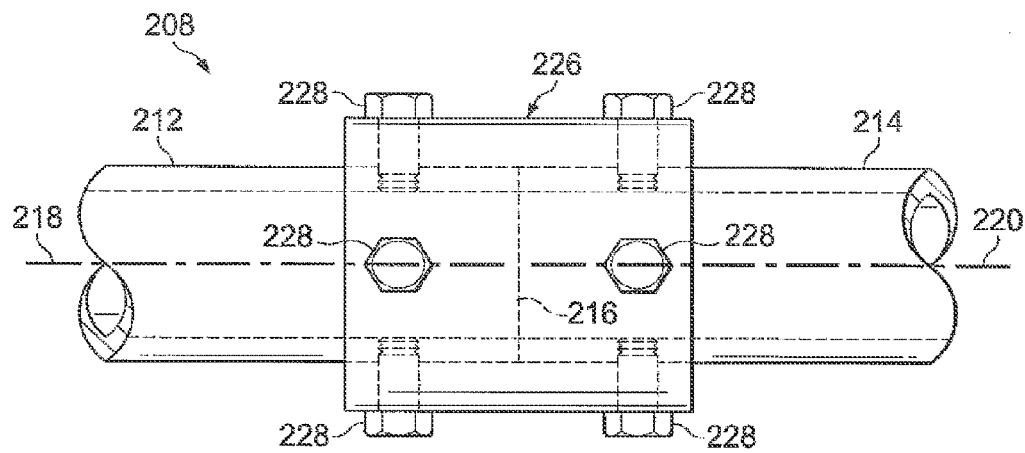
FIG. 7 is an orthogonal side view of a gearbox shaft comprising a collar permanently affixed with bolts according to an embodiment of the disclosure.

Referring now to FIG. 5, FIG. 6, and FIG. 7, an orthogonal side view of a gearbox shaft 208 comprising a collar 226, an orthogonal cross-section view of a gearbox shaft 208 comprising a collar 226, and an orthogonal side view of a gearbox shaft 208 comprising a collar 226 permanently affixed with bolts 228 are shown, respectively, according to embodiments of the disclosure. Gearbox shaft 208 may be substantially similar to gearbox shaft 108 and comprises a first shaft member 212 comprising a first shaft axis 218 and a second shaft member 214 comprising a second shaft axis 220. However, in some embodiments of the disclosure, the joint 216 may comprise a collar 226. The collar 226 generally comprises means for accepting a portion of the first shaft member 212 into one end of the collar 226 and means for accepting a portion of the second shaft member 214 into the opposing end of the collar 226. When assembled, the collar 226 may be configured such that the first shaft axis 218 is aligned and coincident with the second shaft axis 220. The collar 226 is therein permanently affixed to the first shaft member 212 and the second shaft member 214 to form the joint 216. In some embodiments, the collar 226 may comprise a weld 217 to permanently affix the first shaft member 212 and/or the second shaft member 214 to the collar 226. In other embodiments, the collar 226 may comprise bolts 228 to permanently affix the first shaft member 212 and/or the second shaft member 214 to the collar 226. In alternative embodiments, the collar 226 may comprise any combination of welds and/or bolts 228 to permanently affix the first shaft member 212 and the second shaft member 214 to the collar 226. While bolts 228 are depicted in some embodiments of the disclosure, the disclosure should be read to include any fastening means that a person having ordinary skill in the art would immediately appreciate as an equivalent to a bolt 228. In yet other embodiments, the collar 226 may comprise a threaded connection, wherein the first shaft member 212 and the second shaft member 214 also comprise threads on the outer portion of both shaft members, such that the joint 216 is formed by threading the first shaft member 212 and the second shaft member 214 into the collar 226.

Figure 8:
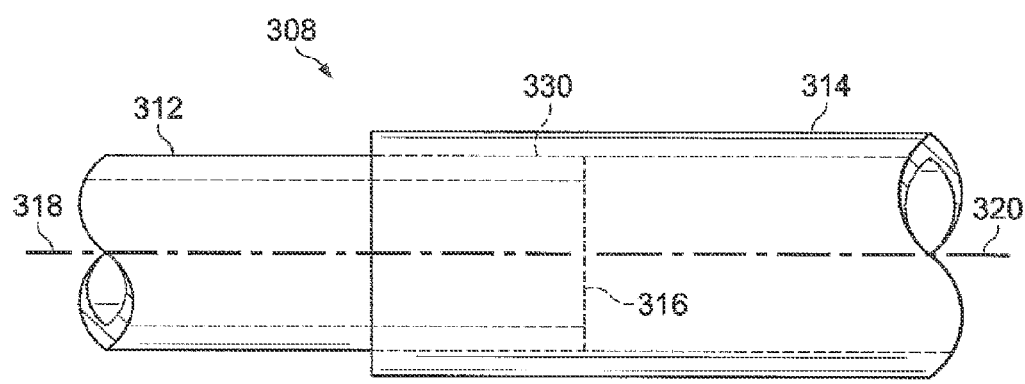
FIG. 8 is an orthogonal side view of a gearbox shaft comprising a cavity according to an embodiment of the disclosure.

Referring now to FIG. 8, an orthogonal view of a gearbox shaft 308 comprising a cavity 330 is shown according to an embodiment of the disclosure. Gearbox shaft 308 may be substantially similar to gearbox shaft 108 and comprises a first shaft member 312 comprising a first shaft axis 318 and a second shaft member 314 comprising a second shaft axis 320. However, in some embodiments of the disclosure, a gearbox shaft 308 may comprise a first shaft member 312 and a second shaft member 314 of different diameters. Accordingly, in some embodiments, the joint 316 may comprise inserting a portion of the first shaft member 312 into a cavity 330 of a second shaft member 314. Alternatively, in other embodiments of the disclosure, the joint 316 may comprise inserting a portion of the second shaft member 314 into a cavity 330 of the first shaft member 312. The cavity 330 generally comprises an inner diameter and/or dimensions capable of receiving a portion of the opposing shaft. In some embodiments, where the receiving shaft may comprise a solid shaft, the cavity 330 may generally comprise a recess in the end of the receiving shaft that is capable of accepting a portion of the opposing shaft member to a specified depth. In other embodiments, where the receiving shaft may comprise a hollow, tubular shaft, the cavity 330 may comprise the inner diameter of the receiving shaft that is capable of accepting the outer diameter of the opposing shaft. In some embodiments, the first shaft member 312 may be welded to the second shaft member 314 when a portion of any shaft member is inserted into another. In other embodiments, the first shaft member 312 and the second shaft member 314 may comprise matching threads, such that the joint 316 is formed by threading a portion of one shaft member into the other shaft member. In yet other embodiments, the joint 316 may also comprise fasteners (e.g. bolts) to permanently affix one shaft member inside the other. In alternative embodiments, the joint 316 may also comprise a spline coupling.

Figure 9:
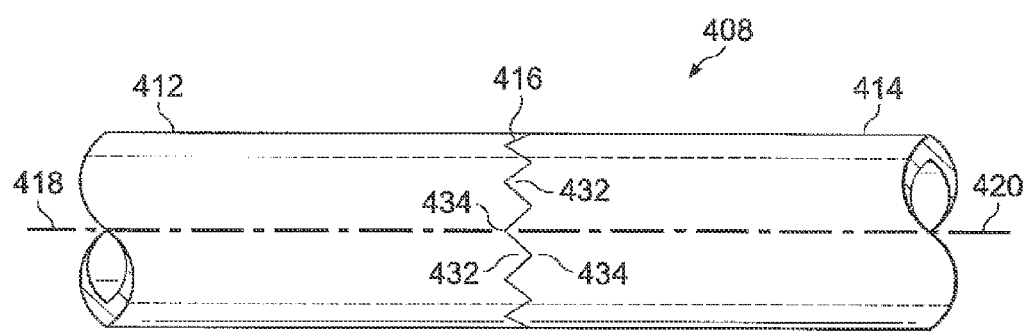
FIG. 9 is an orthogonal side view of a gearbox shaft comprising a series of interlocking teeth and interstitial recesses according to an embodiment of the disclosure.
Figure 10:
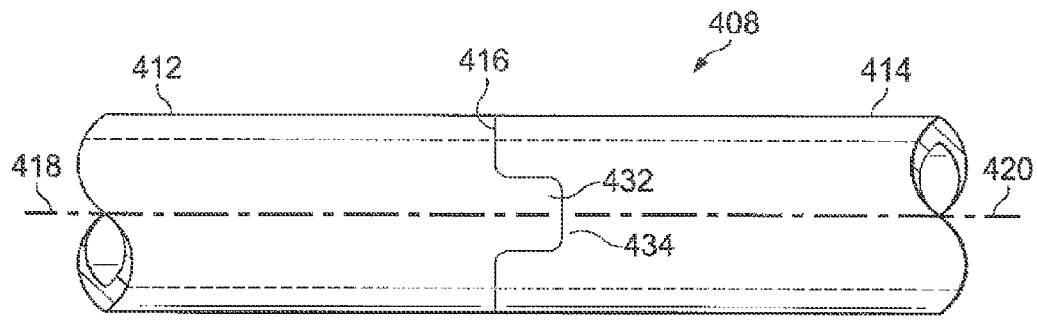
FIG. 10 is an orthogonal side view of a gearbox shaft comprising a single interlocking tooth and single interstitial recess according to another embodiment of the disclosure.

Referring now to FIG. 9 and FIG. 10, an orthogonal view of a gearbox shaft 408 comprising a series of interlocking teeth 432 and interstitial recesses 432 and an orthogonal view of a gearbox shaft 408 comprising a single interlocking tooth 432 and single interstitial recess 434 are shown, respectively, according to embodiments of the disclosure. Gearbox shaft 408 may be substantially similar to gearbox shaft 108 and comprises a first shaft member 412 comprising a first shaft axis 418 and a second shaft member 414 comprising a second shaft axis 420. However, in some embodiments of the disclosure, the first shaft member 412 and the second shaft member 414 may comprise one or more interlocking teeth 432 and one or more interstitial recesses 434. The interlocking teeth 432 of the first shaft member 412 are configured to cohesively engage with the interstitial recesses 434 of the second shaft member 414, and the interlocking teeth 432 of the second shaft member 414 are configured to cohesively engage with the interstitial recesses 434 of the first shaft member 412. The interlocking teeth 432 and interstitial recesses 434 are configured such that when the respective interlocking teeth 432 and interstitial recesses 434 are engaged, the first shaft axis 418 of the first shaft member 412 is aligned with the second shaft axis 420 of the second shaft member 414. In some embodiments of the disclosure, the first shaft member 412 and the second shaft member 414 may comprise a plurality of interlocking teeth 432 and interstitial recesses 434. In other embodiments of the disclosure, the first shaft member 412 may comprise only a single interlocking tooth 432 and the second shaft member 414 may comprise only a single interstitial recess 434. Alternatively, in yet other embodiments, the second shaft member 414 may comprise only a single interlocking tooth 432 and the first shaft member 412 may comprise only a single interstitial recess 434. The use of interlocking teeth 432 and interstitial recesses 434 generally permits an increased surface area of contact for the joint 416 between the first shaft member 412 and the second shaft member 414. In some embodiments, employing interlocking teeth 432 and interstitial recesses 434 may also enhance strength of the joint 416 between the first shaft member 412 and the second shaft member 414.

Referring now to FIG. 11, an orthogonal view of a gearbox shaft 508 comprising a bolted flange 536 is shown according to an embodiment of the disclosure. Gearbox shaft 508 may be substantially similar to gearbox shaft 108 and comprises a first shaft member 512 comprising a first shaft axis 518 and a second shaft member 514 comprising a second shaft axis 520. However, in some embodiments of the disclosure, the first shaft member 512 and the second shaft member 514 may comprise flanges 536 on a distal end of each shaft member. These flanges 536 are generally configured to extend from the outer diameter of the first shaft member 512 and the second shaft member 514, such that the flange 536 of the first shaft member 512 and the flange 536 of the second shaft member 514 provide a mating surface between the two flanges 536, therein forming the joint 536. In some embodiments of the disclosure, the flange 536 of the first shaft member 512 and/or the flange 536 of the second shaft member 514 may be configured to accept bolts 528 to permanently affix the flange 536 of the first shaft member 512 to the flange 536 of the second shaft member 514, therein forming the joint 516. In other embodiments of the disclosure, the flanges 536 may comprise a weld 517, including but not limited to a friction weld, to permanently affix the flanges 536.

Figure 12:
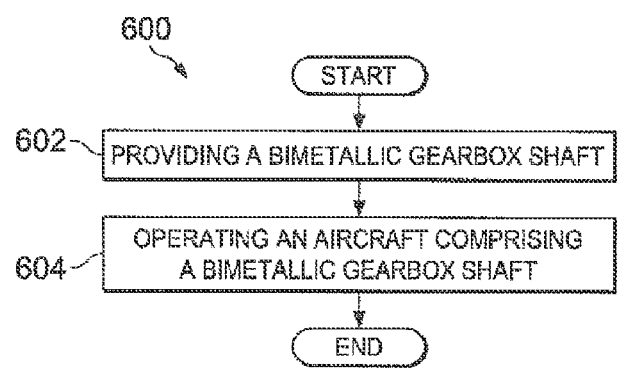
FIG. 12 is a flowchart of a method of providing a bimetallic shaft according to an embodiment of the disclosure.

Referring now to FIG. 12, a method 600 of providing a bimetallic gearbox shaft is disclosed according to an embodiment of the disclosure. The method 600 may begin at block 602 by providing a bimetallic gearbox shaft. In some embodiments of the disclosure, providing the bimetallic gearbox shaft may comprise designing a bimetallic gearbox shaft, manufacturing a bimetallic gearbox shaft, and/or assembling a bimetallic gearbox shaft. The method 600 may conclude at block 604 by operating an aircraft 100 comprising a bimetallic gearbox shaft.

While the gearbox shafts 108, 208, 308, 408, 508 and associated components and configurations are described above in the context of an aircraft 100, the gearbox shafts 108, 208, 308, 408, 508 may be applied to any propeller, proprotor, or rotating shaft application where a gearbox shaft 108, 208, 308, 408, 508 must interface with components external to a gearbox 106. Similarly, any other mechanical device that transmits torque and rotation through a shaft that is subject to wear and corrosion may benefit from utilization of the gearbox shaft 108, 208, 308, 408, 508.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An apparatus comprising:
   a housing;
   a shaft protruding through an opening in the housing, the shaft comprising:
   a first shaft member comprising a first material and having a first shaft axis, a first distal end having a first diameter, and a first proximate end, wherein the first shaft member is disposed within the housing;
   a second shaft member comprising a second material different from the first material, and having a second shaft axis, a second proximate end having a second diameter, and a second distal end, wherein the second shaft member protrudes out of the housing; and
   a joint that permanently affixes the first distal end of the first shaft member to the second proximate end of the second shaft member such that the first shaft axis is aligned with the second shaft axis, wherein the first distal end substantially abuts the second proximate end, and wherein the first diameter is substantially identical to the second diameter; and
   a seal sealing against an outer diameter of the second shaft member at a location at which the second shaft member protrudes out of the housing.

2. The apparatus of claim 1, wherein the housing comprises a gearbox, wherein the second shaft member protrudes externally from the gearbox, and wherein the first shaft member does not protrude from the gearbox.

3. The apparatus of claim 1, wherein the joint comprises a collar, having a first portion of the first shaft member into a first end of the collar and a second portion of the second shaft member into a second end of the collar, and wherein the first end of the collar permanently affixes to the first shaft member and the second end of the collar affixes to the second shaft member.

4. The apparatus of claim 1, wherein the first distal end of the first shaft member comprises interlocking teeth and interstitial recesses, wherein the second proximate end of the second shaft member comprises interlocking teeth and interstitial recesses, wherein the interlocking teeth of the first shaft member cohesively engage with the interstitial recesses of the second shaft member, and wherein the interlocking teeth of the second shaft member cohesively engage with the interstitial recesses of the first shaft member.

5. The apparatus of claim 1, wherein the first distal end of the first shaft member comprises a first flange and the second proximate end of the second shaft member comprises a second flange, and wherein the joint comprises permanently affixing the first flange of the first shaft member to the second flange of the second shaft member.

6. The apparatus of claim 1, wherein the joint comprises a weld.

7. The apparatus of claim 1, further comprising an engine and a fuselage, wherein the housing comprises a gearbox, wherein the second shaft member is mechanically coupled to the engine, and wherein the gearbox is mechanically coupled to a rotor, propeller, or proprotor.

8. A gearbox comprising:
   a gearbox housing;
   a gearbox shaft comprising a joint that permanently affixes a first distal end of a first shaft member to a second proximate end of a second shaft member such that the first shaft member is axially aligned with the second shaft member, the first distal end substantially abuts the second proximate end, and a first diameter of the first shaft member is substantially identical to a second diameter of the second shaft member, and wherein the first shaft member and the second shaft member are formed from different materials; and
   a gearbox shaft seal that surrounds the gearbox shaft radially on a portion of the gearbox shaft having a sealing diameter that is substantially identical to the first diameter to provide a barrier between a first environment inside the gearbox housing and a second environment outside the gearbox housing, wherein the first shaft member is isolated from the second environment.

9. The gearbox of claim 8, wherein the joint is located inside the first environment of the gearbox housing.

10. The gearbox of claim 9, wherein the second shaft member of the gearbox shaft protrudes from the first environment inside the gearbox housing into the second environment outside of the gearbox housing.

11. A rotorcraft comprising:
an engine; and
a gearbox mechanically coupled to a rotor, propeller or a proprotor of the rotorcraft, the gearbox comprising:
   a gearbox housing;
   a gearbox shaft comprising a joint that permanently affixes a first distal end of a first shaft member to a second proximate end of a second shaft member such that the first shaft member is axially aligned with the second shaft member, the second shaft member mechanically coupled to the engine, the first distal end substantially abuts the second proximate end, and a first diameter of the first shaft member is substantially identical to a second diameter of the second shaft member, and wherein the first shaft member and the second shaft member are formed from different materials; and
   a gearbox shaft seal that surrounds the gearbox shaft radially on a portion of the gearbox shaft having a sealing diameter that is substantially identical to the first diameter to provide a barrier between a first environment inside the gearbox housing and a second environment outside the gearbox housing, wherein the first shaft member is isolated from the second environment.

* * * * *